United States Patent
Meyer et al.

(10) Patent No.: US 7,673,211 B2
(45) Date of Patent: Mar. 2, 2010

(54) AUTOMATIC REPEAT REQUEST (ARQ) PROTOCOL HAVING MULTIPLE COMPLEMENTARY FEEDBACK MECHANISMS

(75) Inventors: Michael Meyer, Aachen (DE); Henning Wiemann, Aachen (DE); Johan Torsner, Masaby (FI); Mats Sagfors, Kyrkslatt (FI); Jung-Fu Cheng, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 959 days.

(21) Appl. No.: 11/383,830

(22) Filed: May 17, 2006

(65) Prior Publication Data

US 2006/0282739 A1  Dec. 14, 2006

Related U.S. Application Data

(60) Provisional application No. 60/683,621, filed on May 23, 2005.

(51) Int. Cl.
  G08C 25/02 (2006.01)
  H04L 1/18 (2006.01)
(52) U.S. Cl. ....................... 714/748; 714/750
(58) Field of Classification Search .......... 714/748–751
  See application file for complete search history.

(56) References Cited

U.S. PATENT DOCUMENTS

| 6,816,478 | B1 | 11/2004 | Laroia et al. |
| 7,331,008 | B2* | 2/2008 | Cheng et al. ................. 714/748 |
| 2003/0110435 | A1 | 6/2003 | Wu et al. |

* cited by examiner

Primary Examiner—Guy J Lamarre
(74) Attorney, Agent, or Firm—Roger S. Burleigh

(57) ABSTRACT

Methods for efficiently controlling the retransmission of data units in a wireless telecommunication system, wherein multiple complementary feedback mechanisms are used to control retransmission. A receiver attempts to decode each received data unit. If a data unit is successfully decoded, the receiver transmits positive feedback to the transmitter; if a data unit is not successfully decoded, the receiver transmits negative feedback to the transmitter. In all cases, the transmitter employs at least first and second feedback mechanisms for transmitting the positive and negative feedback. In an exemplary embodiment, acknowledgement (ACK) and non-acknowledgement (NACK) messages are sent in response to the receipt of each data unit on a first unreliable channel and Status Messages identifying sequence numbers of particular data units are periodically transmitted on a second reliable channel; the receiver preferably removes data units from its transmit window only upon receipt of a Status Message indicating successful decode.

46 Claims, 7 Drawing Sheets

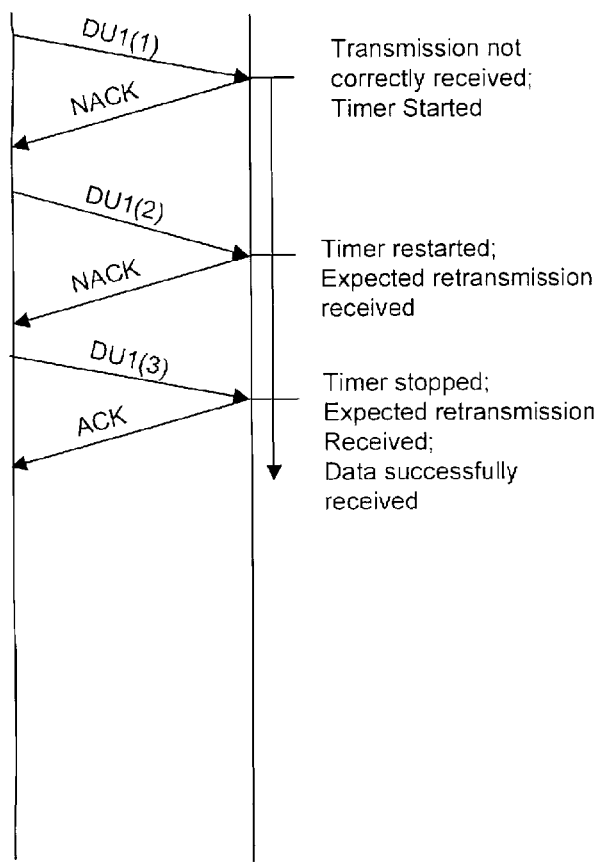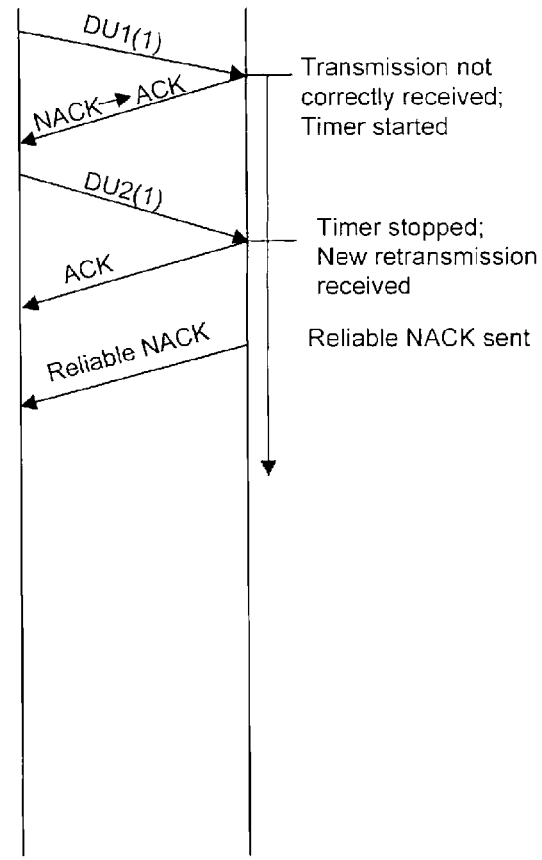

AUTOMATIC REPEAT REQUEST (ARQ) PROTOCOL HAVING MULTIPLE COMPLEMENTARY FEEDBACK MECHANISMS

CROSS-REFERENCE TO RELATED APPLICATIONS

This application claims the benefit of U.S. Provisional Application No. 60/683,621, filed May 23, 2005, the disclosure of which is incorporated herein by reference.

TECHNICAL FIELD OF THE INVENTION

The invention relates, in general, to wireless communications and, in particular, to transmission protocols.

BACKGROUND

Many link layer protocols support a reliable data transport by performing retransmissions for failed transmissions. Failed transmissions are reported by feedback messages, such as acknowledgement (ACK) and non-acknowledgement (NACK) messages according to Automatic Repeat Request (ARQ) protocols. ARQ mechanisms are, in particular, important for wireless transport media, but are also applied to wired links. Examples for ARQ mechanisms operating over wireless channels include the Radio Link Control (RLC) protocols for General Packet Radio Service (GPRS) and Wideband Code Division Multiple Access (WCDMA), as well as the Hybrid ARQ (HARQ) protocol in Medium Access Control high-speed (MAC-hs) for High-Speed Downlink Packet Access (HSDPA). A problem with such protocols is that they may not provide fast and reliable feedback and efficient use of radio resources.

Some prior art protocols use a simple and fast ACK/NACK concept which indicates whether a data frame has been successfully received. Such protocols provide no sequence numbers in the feedback, but instead the transmitter and receiver implicitly relate the feedback to a particular transmission by exploiting a fixed timing relationship. This is often referred to as synchronous feedback. The advantage of such an approach is that these short signals can be sent often as the transmission resource consumption is relatively low. Achieving coding gains, however, is limited, or impossible, if each ACK or NACK is a single bit. Thus, there is the risk of misinterpretation of such single bit at the receiver. Fading dips further increase the error probability, and achieving a very low error rate can consume a lot of resources to cover "worst-case" dips. Thus, such signalling is also costly if very low error ratios are required, because that can only be achieved by increasing the transmission power or by repeating the information. An update, or retransmission, of each feedback message is not possible, however, as it needs to be time-aligned to the transmission of the corresponding data.

Another class of protocols uses feedback, or control, units (sometimes called Status Messages). Such mechanisms are often applied for window-based ARQ protocols. Feedback units may explicitly include sequence numbers and a checksum and, therefore, the reliability of feedback messages can be confirmed. Incorrectly received feedback is not used, but dropped at the data sender. Retransmissions or transmissions of up-dates of the feedback are used to ensure that the feedback is correctly received. It should be noted that such feedback units do not require any time-alignment to the corresponding data units due to the sequence numbering of data units and the reference to those in the feedback units. These types of feedback mechanisms have the advantage of being very reliable; however, they are typically much slower compared to synchronous ACK/NACK feedback mechanisms.

Therefore, what is needed in the art are integrated retransmission protocols that achieve the efficiencies of conventional ACK/NACK protocols, while simultaneously realizing the reliability of explicit feedback messages. Preferably, such integrated retransmission protocols can be implemented in a single protocol entity and are based on the same protocol data units, protocol state and logic.

SUMMARY

To address the deficiencies of the prior art, the invention provides methods, which can be incorporated in transmitters and receivers, for efficiently controlling the retransmission of data units in a wireless telecommunication system. According to the principles of the invention, multiple complementary feedback mechanisms are used to control retransmission. In general, in response to the receipt of a plurality of data units, a receiver attempts to decode each data unit. If a data unit is successfully decoded, the receiver transmits positive feedback to the transmitter; the positive feedback indicates to the transmitter that the data unit was successfully decoded by the receiver. If a data unit is not successfully decoded, the receiver transmits negative feedback to the transmitter; the negative feedback indicates to the transmitter that the data unit was not successfully decoded by the receiver. In all cases, the receiver employs at least first and second feedback mechanisms for transmitting feedback.

The first and second feedback mechanisms can utilize first and second radio channels; the first and second radio channels can share a common carrier frequency. The first radio channel can be a narrow bandwidth channel and can utilize an unreliable transmission method; the second radio channel preferably utilizes a reliable transmission method.

The positive feedback can include an acknowledgement (ACK) message and the negative feedback can include a non-acknowledgement (NACK) message. The positive and negative feedback can further include a Status Message that includes one or more position identifiers or sequence numbers identifying ones of the plurality of data units. A Status Message can, for example, be a single sequence number indicating the highest numbered of the plurality of data units successfully received, or it can include the sequence number for each data unit that has been correctly received or the sequence number for each data unit that has been incorrectly received, or both. Status Messages can, for example, be automatically transmitted in response to the receipt of a predetermined number of data units. Alternatively, Status Messages can be sent in response to a request from the transmitter; the request can, for example, be a flag within one of the data units.

In an exemplary embodiment, the ACK and NACK messages do not include sequence numbers and are transmitted on the first radio channel using an unreliable transmission method and Status Messages are transmitted on the second radio channel using a reliable transmission method. The ACK and NACK messages can be, for example, single data bits and can be unconditionally transmitted in response to the receipt of each of the plurality of data units. Preferably, the transmitter retransmits a data unit in response to the receipt of a NACK or a Status Message indicating the non-delivery or failure to decode such data unit; the transmitter, however, does not remove a data unit from its send buffer upon receiving an ACK, but only in response to a Status Message indicating the successful decoding of such data unit by the receiver. Status Messages can include a Cyclic Redundancy Check (CRC) value whereby the transmitter can verify that a Status Message is correctly received.

The method can further include detecting, by a receiver, an error in the transmission of negative feedback; an error can be indicated by the expiration of a timer before the expected receipt of a retransmitted data unit for which negative feedback was sent. In the event of detecting such an error, pending positive or negative feedback is preferably re-transmitted using the second feedback mechanism.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

DETAILED DESCRIPTION

The present invention combines the advantages of multiple feedback signalling concepts in one protocol. This is, in particular, possible in a distributed access network architecture, for example, when an Automatic Repeat Request (ARQ) protocol is terminated in a base station (or access point) and a terminal. In a centralized access network architecture, the advantages of the invention can, for example, be achieved in combination with a RelayARQ concept (see: H. Wiemann, M. Meyer, R. Ludwig, C.P.O., *A Novel Multi-Hop ARQ Concept*, IEEE 61st Semiannual Vehicular Technology Conference (VTC), May 30-Jun. 1, 2005, incorporated herein by reference). The invention is preferably implemented as a single protocol using two (or more) specific feedback formats on two (or more) specific feedback mechanisms; as described hereinafter, the feedback mechanisms can have different channel characteristics in terms of reliability, resource consumption and delay. Furthermore, the two (or more) feedback formats can use different means to indicate the receiver status; for example:

1. synchronous and binary (ACK/NACK) feedback as in HS-DSCH or E-DCH; this mechanism relies on a fixed timing relationship between data transmission and the corresponding feedback.
2. asynchronous and explicit feedback as in RLC; a status message contains identifiers that explicitly determine the data units the feedback refers to, wherein the identifiers can be sequence numbers or explicit timing references.

Both feedback message formats indicate receiver information from the same protocol entity and refer to the same protocol data units, protocol state and logic. An advantage of using two different feedback reporting mechanisms is that the operation can be adjusted to instantaneous radio conditions and transmission error situations in order to achieve a fast, reliable, and radio resource efficient feedback exchange.

Figure 1:
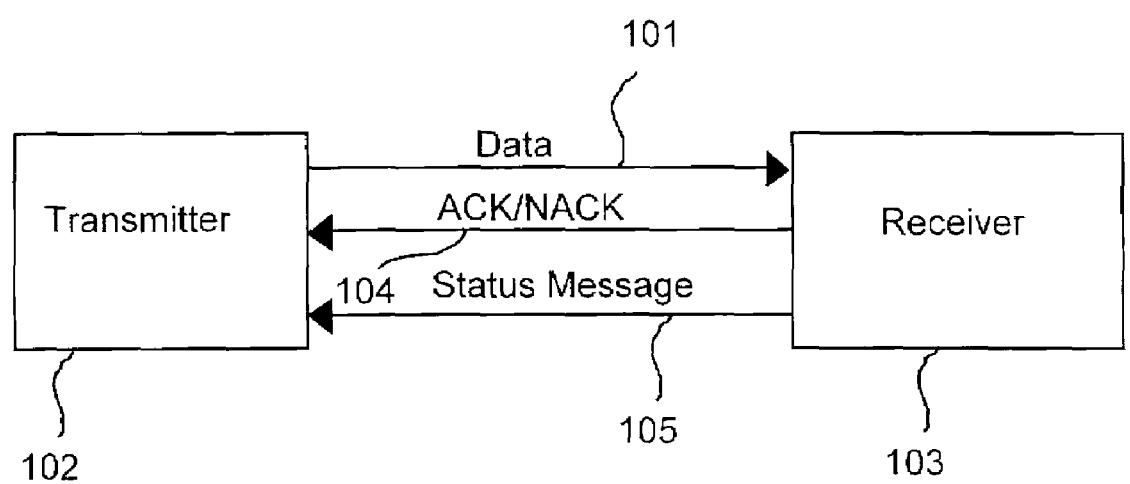
FIG. 1 illustrates a schematic representation of an integrated retransmission protocol according to the principles of the invention.

Referring to FIG. 1, illustrated is a schematic representation of an integrated retransmission protocol according to the principles of the invention. Data units are transmitted 101 from a transmitter 102 to a receiver 103, each of which defines a protocol endpoint that maintains its own protocol state; bidirectional data transmission can be obtained using one retransmission protocol transmitter/receiver pair in each direction. As illustrated, two types of feedback mechanisms are used to indicate the receiver's protocol state; an acknowledgement (ACK)/non-acknowledgement (NACK) Automatic Repeat Request (ARQ) mechanism 104 and a Status Message mechanism 105. It is assumed that the retransmission protocol is a window-based ARQ protocol that assigns sequence numbers to each protocol data unit. The sequence numbers specifically identify each protocol data unit and can be used to signal which data units have been correctly received and which should be retransmitted.

For the ACK/NACK feedback mechanism, there can be scenarios with more than one data unit per time interval (e.g., MIMO). In such embodiments, there can be one feedback bit per data unit or, alternatively, one bit for a predefined number of data units. An alternative is to use more than one bit per data unit, but still synchronous feedback.

Figure 2:
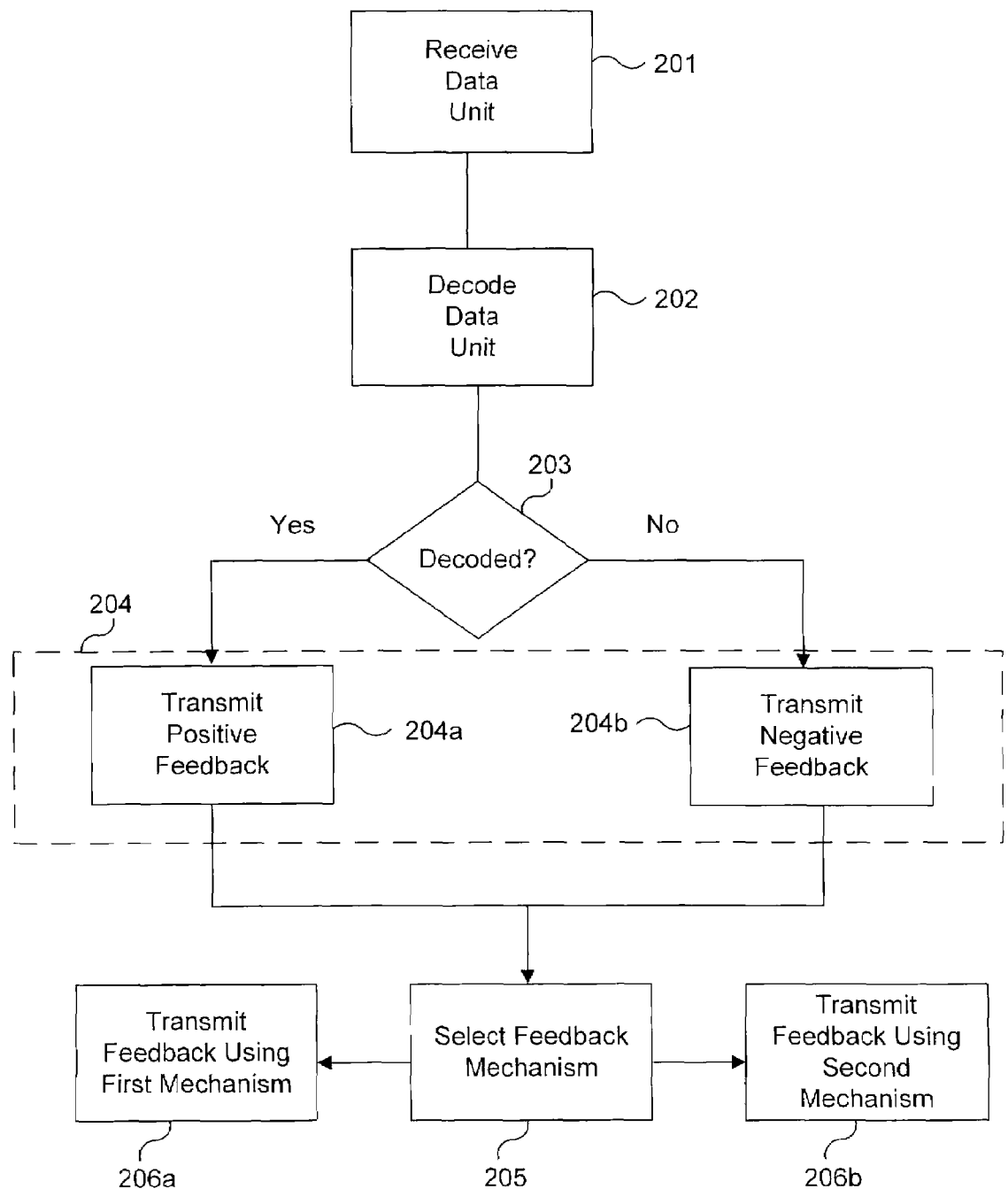
FIG. 2 illustrates a flow diagram of the general method of the retransmission protocol for a receiver.

Referring now to FIG. 2, with continuing reference to FIG. 1, illustrated is a flow diagram of the general method of the retransmission protocol for receiver 102. In general, in response to the receipt of a plurality of data units (Step 201), the receiver 102 attempts to decode each data unit (Step 202) and transmit feedback (Step 204), as a function of such decoding, to transmitter 102. If a data unit is successfully decoded (Step 203), the receiver transmits positive feedback to the transmitter (Step 204a); the positive feedback indicates to the transmitter that the data unit was successfully decoded by the receiver. If a data unit is not successfully decoded (Step 203), the receiver transmits negative feedback to the transmitter (Step 204b); the negative feedback indicates to the transmitter that the data unit was not successfully decoded by the receiver. In all cases, as described hereinafter, the transmitter 102 selects a feedback mechanism (Step 205) and transmits the feedback using one of two or more feedback mechanisms (Steps 206a, 206b).

Figure 3:
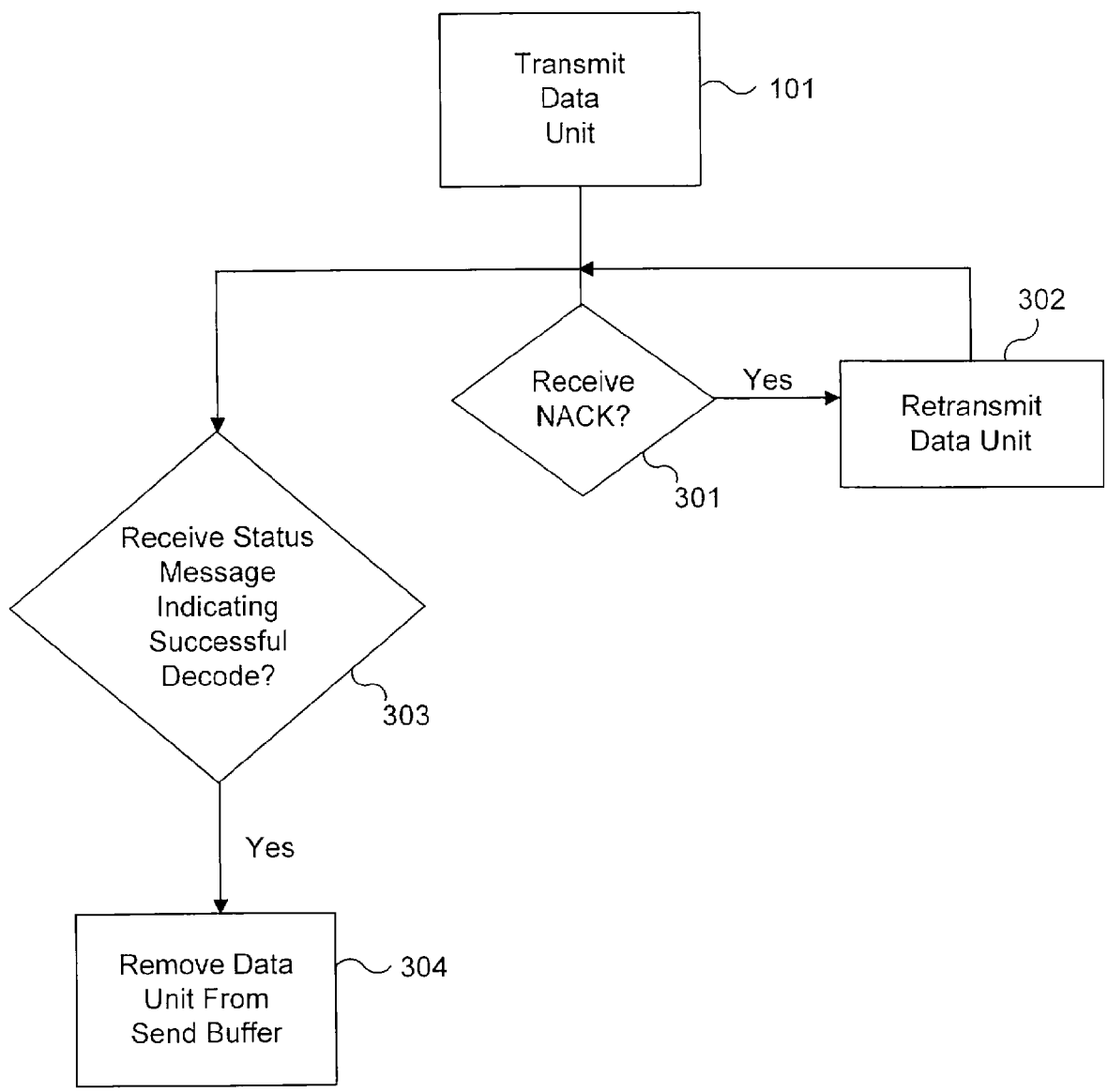
FIG. 3 illustrates a flow diagram of an exemplary embodiment of an integrated retransmission protocol, according to the principles of the invention, in a transmitter.
Figure 4:
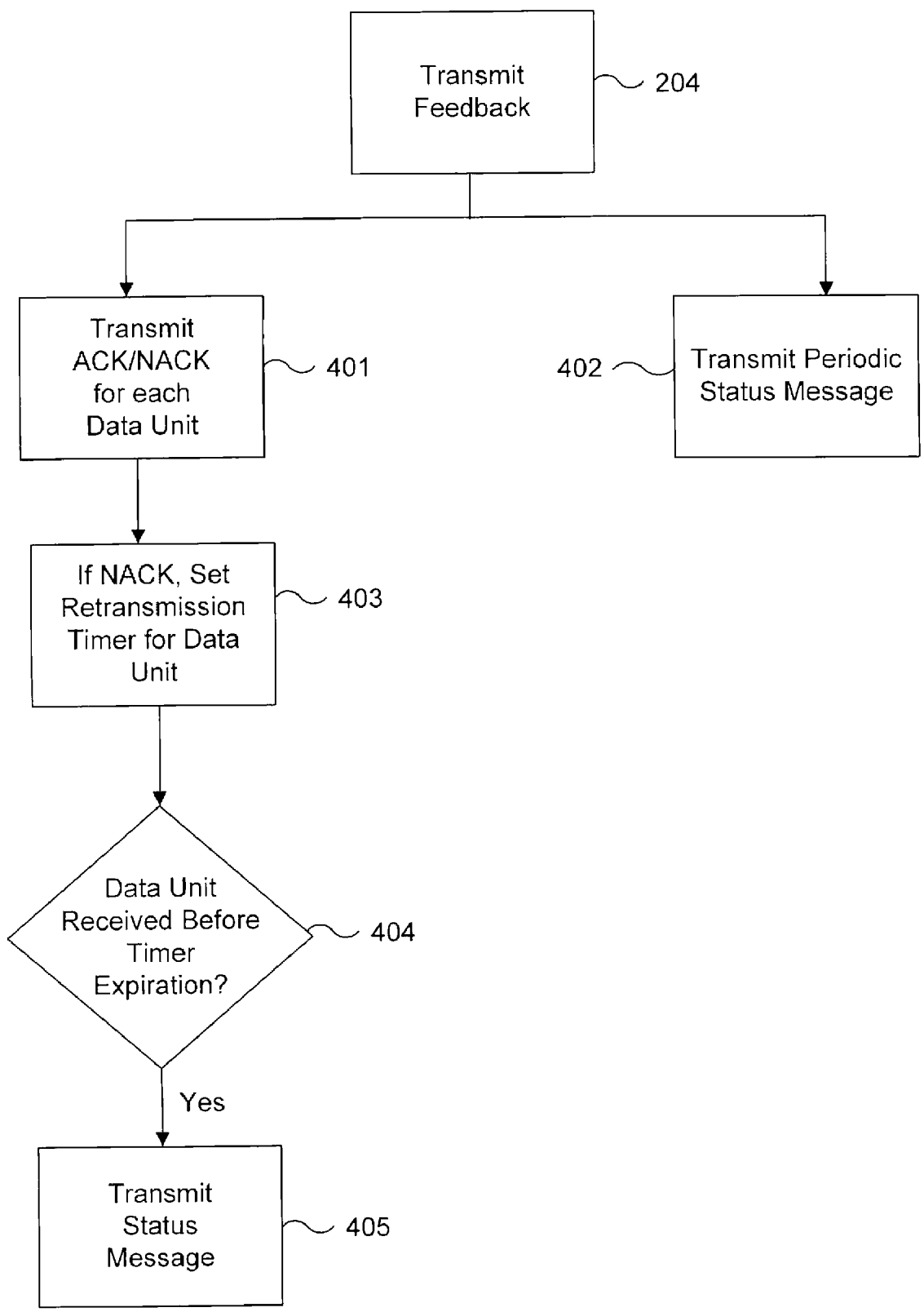
FIG. 4 illustrates a flow diagram of an exemplary embodiment of an integrated retransmission protocol, according to the principles of the invention, in a receiver.

Referring now to FIGS. 3 and 4 (with continuing reference to FIGS. 1 and 2) illustrated are flow diagrams of an exemplary embodiment of an integrated retransmission protocol, according to the principles of the invention, for the transmitter 102 and receiver 103, respectively. In order to reduce retransmission delays, it is desirable for the receiver 103 to know as soon as possible whether a transmission was successful. Therefore, in a preferred embodiment, for each data unit transmitted (Step 101) by transmitter 102, the receiver 103 transmits feedback (Step 204). In this embodiment, synchronous ACK/NACK feedback is transmitted (Step 401) by receiver 103 in response to the reception of every data unit. After the receiver has tried to decode a data unit (Step 202), it sends either an ACK if it was successfully decoded (Step 204a) or a NACK indicating that the decoding was not successful (Step 204b). If the transmitter 102 receives a NACK (Step 301), it retransmits the corresponding data unit (Step 302); it does not, however, remove the data unit from its send buffer.

Some wireless ARQ protocols do not explicitly signal the sequence number of a data unit but rely on a fixed timing structure, meaning that the transmitter knows to which transmission the feedback belongs. For example, assuming a fixed frame length, the transmitter expects feedback for a data unit sent in frame x in frame x+4. Since the feedback information is associated to the time of transmission of the feedback, however, the status for a given data unit can only be indicated once and it is not possible to repeat the indication to recover from lost or erroneous feedback signals.

According to the principles of the invention, a first feedback mechanism is used to transmit the ACK/NACK feedback, and can utilize a very narrow, low cost (in terms of radio resources), but relatively unreliable feedback format. A second feedback mechanism can be used to send additional feedback based on explicit feedback messages (Status Messages) and, preferably, utilizes a more reliable feedback format. Thus, as shown in FIG. 4, the receiver 103, in addition to transmitting ACK/NACK messages for each received data unit, also transmits periodic Status Messages (Step 402).

Each Status Message contains one or more sequence position identifiers, which can be a sequence number associated with each particular data unit or an explicit timing reference referring to a time interval in which a transmission attempt was detected by the receiver; such Status Messages inform the transmitter about the reception state of the data identified by the above mentioned position identifiers. The advantage of using a sequence number or an explicit timing reference as a reference point is that there are no strict timing requirements for the transmission of the feedback. Even if this asynchronous status message is delayed by a few frames, it can still be interpreted by the transmitter 102 since it includes a reference point. This implies that consecutive Status Messages can contain information about the same data units, which increases the reliability of the protocol since a lost status message only causes some additional delay.

A Status Message can, for example, indicate that up to an explicitly given sequence number or transmission time all data units have been correctly received; such a Status Message can be referred to as a cumulative acknowledgement. Alternatively, a Status Message can include a list of data units which have been correctly or incorrectly received. The list of data units can be compressed in the form of a bitmap for more efficient transmission. In addition, the Status Messages can include a Cyclic Redundancy Check (CRC) value to ensure that only correctly received status information is used to manipulate the transmitter window. When the transmitter 102 receives a Status Message indicating the successful decode of one or more data units (Step 303), it then removes such identified data units from its send buffer (Step 304).

In an exemplary embodiment, the Status Messages are transmitted on a second radio channel which can use more efficient coding since the messages are larger. Time alignment, however, is not necessary. Furthermore, the error rate of these messages can be different than those transmitted over the first channel.

A particular advantage of the invention is that both feedback mechanisms can be provided by one protocol entity and based on the same protocol state. This means that both low delay and high reliability can be achieved while consuming a minimum of resources for transmitting the feedback. In addition, there exists the possibility for adaptive feedback strategies depending on radio conditions and/or error patterns, which are otherwise only possible with complex interlayer communication. The integrated retransmission protocol can also yield lower error rates compared to a synchronized ARQ protocol and faster error correction compared to an asynchronous window based protocol; both gains can be achieved with a low level of resource consumption for the feedback.

Since both feedback messages signal information belonging to the same protocol state, it is possible that the synchronous NACK signals are exclusively used to trigger retransmissions, but ACKs do not trigger the removal of data from the transmitter send buffer. This is due to the fact that 1-bit ACK/NACK messages are not reliable, i.e., the transmitter 102 may easily interpret a NACK as an ACK. If the transmitter 102 advances its transmit window or removes data units from its send buffer due to such misinterpretation, the result would be unrecoverable data loss. Therefore, only the reliable Status Messages should be used to trigger the removal of data units from the transmitter send buffer (FIG. 3; Steps 303, 304); this is illustrated in FIG. 5.

Figure 5:
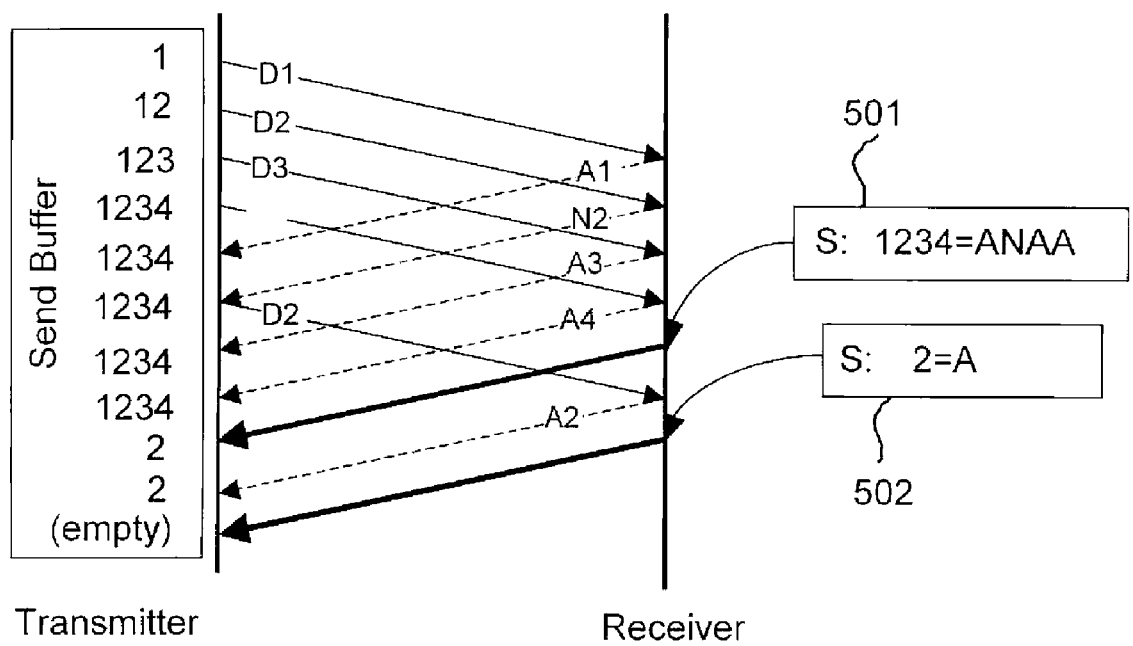
FIG. 5 illustrates the operation of the invention with respect to a transmitter's send buffer.

FIG. 5 illustrates the operation of the invention with respect to a transmitter's send buffer. The transmitter 102 includes a send buffer which holds transmitted data units. As illustrated, data unit D1 is first transmitted, followed by data units, D2, D3 and D4. As each data unit is transmitted it is stored in the send buffer; thus, data units D1 through D4 are stored in the send buffer after the transmission of data unit D4. At the receiver, each data unit is decoded and an ACK or NACK is transmitted back to the receiver. For the example illustrated in FIG. 5, data unit D1 is successfully decoded and, therefore, an acknowledgement (ACK) A1 is transmitted back to the transmitter. Data unit D2, however, is not successfully decoded and a non-acknowledgement (NACK) N2 is sent to the transmitter, triggering the retransmission of data unit D2. Data units D3 and D4 are also successfully decoded and, therefore, ACKs A3 and A4 are transmitted back to the transmitter. At this point, data units D1 through D4 are still in the send buffer. Next, a Status Message 501 is received; the status message identifies the successful decode status of data units D1, D3, and D4 as acknowledged (A) and the unsuccessful decode status of data unit D2 as non-acknowledged (N). Because of the reliable nature of the Status Message, the transmitter can now remove data units D1, D3 and D4 from its send buffer, leaving only data unit D2. In the illustrated example, the decoding of retransmitted data unit D2 was successful and an ACK A2 is sent to the transmitter. Data unit D2 is not removed from the send buffer, however, until the subsequent receipt of the Status Message 502 indicating the successful decode of data unit D2; in the illustrated example, the send buffer is then empty.

Whereas both feedback messages signal information belonging to the same protocol state, it is possible for NACK signals to be used to exclusively trigger retransmissions, while ACK signals do not trigger the removal of a corresponding data unit from the send buffer. This is due to the fact that 1-bit ACK/NACK messages are not reliable; if a NACK is interpreted by the transmitter as an ACK, the transmitter would advance the transmit window or remove data units from the send buffer, leading to unrecoverable data loss. To avoid that, preferably only reliable Status Messages can trigger the removal of data from the transmitter send buffer.

As described supra, the ACK and NACK feedback can be 1-bit. A potential problem with using single bit acknowledgement messages, however, is that a NACK may be incorrectly received as an ACK; i.e., the receiver 103 does not receive a data unit correctly and responds with a NACK signal, but the transmitter 102 interprets this signal as an ACK and incorrectly assumes that the data has been received correctly. Assuming that the protocol is operated asynchronously (i.e., retransmissions are not sent with a fixed offset to reception of a NACK), the receiver 103 will not know when to expect a retransmission of the incorrectly received data unit; thus, it is impossible for the receiver to immediately detect that a NACK to ACK error occurred. To solve this problem, a timer at the receiver can be used that is started upon reception of a non-successful transmission; alternatively, the timer can be started when the corresponding NACK is transmitted or at similar related events. The timer is stopped if the expected retransmission is received and the data can be decoded successfully. The timer is restarted, however, if a retransmission is received and the data can still not be decoded; i.e., the transmission errors persist. An error in the transmission of the feedback is indicated if the timer expires before the expected retransmission is received. Upon such an error, the feedback is then retransmitted using a second feedback mechanism. Furthermore, if new data is received instead of the expected retransmission, the receiver retransmits the feedback using a second feedback format and stops the timer.

Figure 6A:
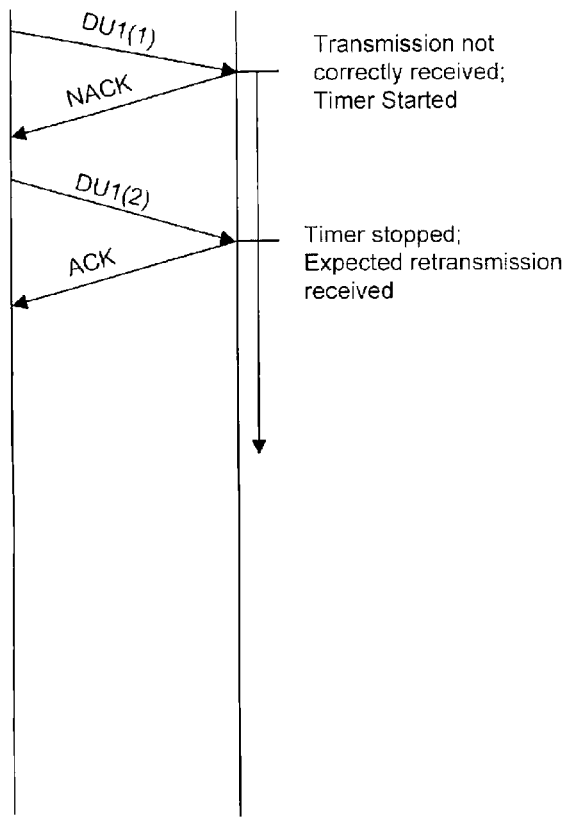
FIGS. 6a and 6b illustrate message sequence charts that illustrate the operation of a timer used to detect feedback errors; and, FIGS. 7a and 7b depict further message sequence charts that illustrate the operation of the timer.
Figure 6B:
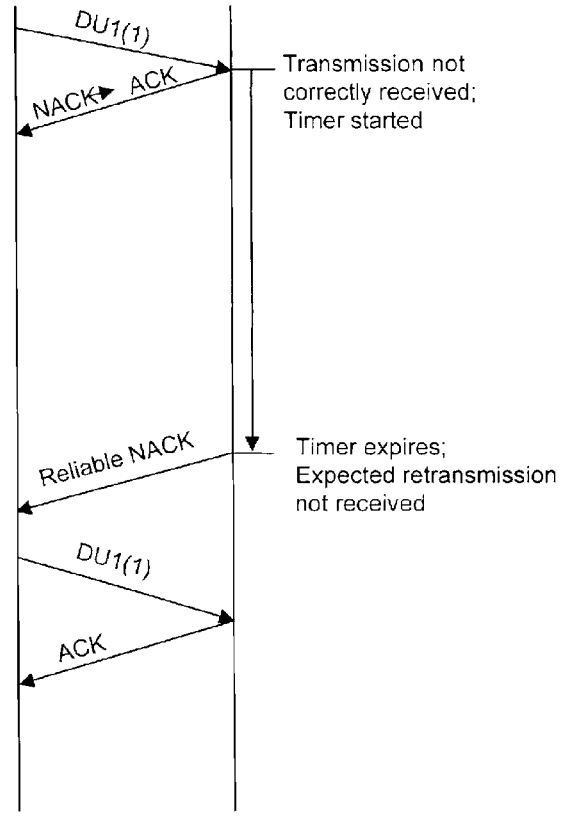

Shown in FIGS. 6a and 6b are message sequence charts that illustrate the operation of the timer. FIG. 6a depicts the case when a transmission error occurs but the NACK is correctly received; the timer is started but the retransmission arrives as expected and the timer is canceled. FIG. 6b depicts the case where a transmission error occurs and the NACK is not correctly received at the transmitter; i.e., the transmitter interprets the NACK as an ACK. Because the transmitter believes that no further action is required, it does not retransmit the data unit as expected by the receiver and the timer eventually expires. When the timer expires, another feedback message is sent to the transmitter to request a retransmission. This feedback message should be sent using a reliable method; the message should include information about which data unit to retransmit and also a mechanism, such as a CRC value, to ensure that is correctly interpreted at the transmitter. Once this feedback message is received and the transmitter knows that a data unit was not successfully delivered, it retransmits the identified data unit.

Turning now to FIGS. 7a and 7b, depicted are further message sequence charts that illustrate the operation of the timer. 7a illustrates a case where no NACK-to-ACK error occurs, but a retransmission is not sufficient to successfully decode the data unit and a second NACK is transmitted. The timer is restarted and a new retransmission is expected; once the transmission is successful, the timer is cancelled. Finally, FIG. 7b illustrates a case when a NACK-to-ACK error occurs for a first data unit. Because the transmitter believes that the first data unit was successfully received, a second data unit is transmitted. In this case, the receiver detects that a new data unit has been sent instead of the expected retransmission. In this case, because the receiver cannot expect a retransmission for the first data unit, it will stop the timer and a reliable feedback message is sent to request retransmission of the first data unit.

The principles of the invention can be modified in accordance with certain additional features. In one alternative embodiment, the second feedback format may only be sent for data (flows) that require high reliability. In another embodiment, the transmission of Status Messages can be triggered depending on the reliability of the ACK/NACK feedback. Based on the decoding of the ACK/NACK feedback, the transmitter can determine the reliability of the ACK/NACK messages. For very reliable ("certain") ACKs, there may be no need to send any Status Messages; in such cases, the transmitter and receiver windows can be advanced without any higher level Status Messages. Upon reception of an "uncertain" ACK/NACK, however, the transmitter can send a request for a Status Message to update its protocol state with more reliable feedback. In one embodiment, a "poll" for a Status Message is realized within the signalling for the ARQ (e.g., using out-band signalling) to achieve a fast request for status. As an alternative, the poll could be indicated with a flag in a data unit.

When a NACK is received, a corresponding data unit is preferably retransmitted immediately to minimize delay. In case the reliability of the NACK message is low (which can be determined from decoding metrics), however, there is a risk that the retransmission is unnecessary, leading to reduced efficiency. To handle this problem, the receiver can perform immediate retransmissions only if the received NACKs have a reliability above a certain threshold. If the reliability is below the threshold, the data unit can be buffered until receipt of a reliable Status Message containing a reliable indication of whether the data unit should be retransmitted. This feature can be advantageously combined with the previously-described polling feature for unreliable ACKs to achieve timely transmission of a Status Message. The threshold for performing a retransmission based on "uncertain" feedback can be adapted to the system load so that a higher reliability threshold is used during high system load when resources are limited.

Whereas both the ACK/NACK and Status Message feedback messages provide information about the same data units, there is a risk for multiple retransmissions of the same data unit. If the ACK/NACK feedback causes certain data units to be retransmitted, it is possible that the retransmission will not be completed by the transmitter when a Status Message is sent by the receiver (or the data units have been retransmitted but not yet received and processed by the receiver). In this case, the same protocol data units may be requested for retransmission a second time by the Status Message, leading to unnecessary retransmissions. This problem can be addressed by including a time reference (e.g., frame number) in the Status Message; the time reference indicates up to which point in time (i.e., which frame) received data units were considered when the Status Message was transmitted. When the transmitter receives the Status Message, it can determine that any data units that have been retransmitted (or requested to be retransmitted by the ACK/NACK feedback) after the indicated time (i.e., frame) should not be retransmitted if it is requested in the Status Report.

Finally, whereas both types of feedback messages relate to the same protocol state, it is possible to evaluate the error ratio of the ACK/NACK feedback by comparing it to the successfully received Status Message feedback. The determined error ratio for the ACK/NACK feedback can be used as an indicator of whether the signalling should be modified, for example, by adapting transmission parameters like transmission power, diversity, etc. For this purpose, a signal can be sent from the transmitter to the receiver to inform it that such transmission parameters should be adapted.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

We claim:

1. A method for controlling the retransmission of data units in a wireless telecommunication system, comprising the steps of:
receiving a plurality of data units from a transmitter at a receiver;
in response to the receipt of each of said plurality of data units, attempting to decode said data unit at said receiver, and:
if said data unit is successfully decoded, transmitting positive feedback from said receiver to said transmitter, said positive feedback indicating to said transmitter that said data unit was successfully decoded by said receiver; or,
if said data unit is not successfully decoded, transmitting negative feedback from said receiver to said transmitter, said negative feedback indicating to said transmitter that said data unit was not successfully decoded by said receiver;
selecting a first or a second feedback mechanism for transmitting said positive or negative feedback, wherein said feedback mechanisms differ at least in terms of channel characteristics;
wherein said positive feedback comprises an acknowledgement (ACK) message and said negative feedback comprises a non-acknowledgement (NACK) message; and
transmitting a Status Message from said receiver to said transmitter, said status message comprising explicit information identifying ones of said plurality of said data units.

2. The method recited in claim 1, wherein said ACK and NACK messages consist of single data bits as synchronous feedback.

3. The method recited in claim 1, wherein one of said ACK and NACK messages is unconditionally transmitted in response to the receipt of each of said plurality of data units.

4. The method recited in claim 1, wherein said first and second feedback mechanisms utilize first and second radio channels.

5. The method recited in claim 4, wherein said first and second radio channels utilize a common carrier frequency.

6. The method recited in claim 1, wherein said explicit information comprises one or more explicit timing references.

7. The method recited in claim 1, wherein said explicit information comprises one or more data unit sequence numbers.

8. The method recited in claim 7, wherein said Status Message comprises a single sequence position identifier indicating the highest numbered of said plurality of data units successfully received in sequence.

9. The method recited in claim 1, wherein said ACK and NACK messages are transmitted on a first radio channel and said Status Message is transmitted on a second radio channel.

10. The method recited in claim 1, wherein said first feedback mechanism utilizes an unreliable transmission method.

11. The method recited in claim 1, wherein said second feedback mechanism utilizes a reliable transmission method.

12. The method recited in claim 1, wherein said Status Message is transmitted in response to the receipt of a predetermined number of said plurality of data units or after a predetermined time interval.

13. The method recited in claim 1, wherein said Status Message is sent in response to a request from said transmitter.

14. The method recited in claim 13, wherein said request from said transmitter comprises a flag within one of said plurality of data units.

15. The method recited in claim 1, wherein said Status Message comprises a sequence position identifier for each of said plurality of data units that have been correctly received.

16. The method recited in claim 1, wherein said Status Message comprises a sequence position identifier for each of said plurality of data units that have been incorrectly received.

17. The method recited in claim 1, wherein said Status Message comprises a Cyclic Redundancy Check (CRC) value whereby said transmitter can verify that said Status Message is correctly received.

18. The method recited in claim 1, wherein said transmitter does not remove a transmitted data unit from its send buffer in response to receipt of a corresponding acknowledgement (ACK) message, but removes such transmitted data unit from its send buffer in response to receipt of a Status Message indicating the successful decoding of said data unit by said receiver.

19. The method recited in claim 1, wherein said transmitter retransmits a data unit in response to the receipt of said negative feedback.

20. The method recited in claim 19, further comprising the step of detecting, by said receiver, an error in the transmission of said negative feedback.

21. The method recited in claim 20, wherein said detection is based on the reception of a data unit other than an expected retransmitted data unit.

22. The method recited in claim 20, wherein said detection is based on the expiration of a timer before the receipt of an expected retransmitted data unit for which said negative feedback was sent.

23. The method recited in claim 22, wherein said positive or negative feedback is transmitted using said second feedback mechanism in response to the expiration of said timer.

24. A method of operation of a receiver for use in a wireless telecommunication system, said receiver operative to control the retransmission of received data units, said method comprising the steps of:
receiving a plurality of data units from a transmitter, said data units each comprising a sequence number;
attempting, in response to the receipt of each of said plurality of data units, to decode each said data unit, and:
if said data unit is successfully decoded, transmitting an acknowledgement (ACK) message to said transmitter, said ACK indicating to said transmitter that said data unit was successfully decoded by said receiver; or,
if said data unit is not successfully decoded, transmitting a non-acknowledgement (NACK) message to said transmitter, said NACK indicating to said transmitter that said data unit was not successfully decoded by said receiver;
wherein said ACK or NACK is transmitted to said transmitter on a first radio channel; and,
transmitting a Status Message to said transmitter on a second radio channel, said status message comprising one or more sequence position identifiers corresponding to said plurality of said data units.

25. The method recited in claim 24, wherein said ACK and NACK messages consist of single bits.

26. The method recited in claim 24, wherein said first radio channel utilizes an unreliable transmission method.

27. The method recited in claim 24, wherein said second radio channel utilizes a reliable transmission method.

28. The method recited in claim 24, wherein said Status Message is automatically transmitted in response to the receipt of a predetermined number of said plurality of data units.

29. The method recited in claim 24, wherein said Status Message is sent in response to a request from said transmitter.

30. The method recited in claim 29, wherein said request from said transmitter comprises a flag within one of said plurality of data units.

31. The method recited in claim 24, wherein said Status Message comprises a single sequence position identifier indicating the highest numbered of said plurality of data units successfully received in sequence.

32. The method recited in claim 24, wherein said Status Message comprises the sequence position identifier for each of said plurality of data units that have been correctly received.

33. The method recited in claim 24, wherein said Status Message comprises the sequence position identifier for each of said plurality of data units that have been incorrectly received.

34. The method recited in claim 24, wherein said Status Message comprises a Cyclic Redundancy Check (CRC) value whereby said transmitter can verify that said Status Message is correctly received.

35. A method of operation of a transmitter for use in a wireless telecommunication system, said transmitter operative to selectively retransmit data units, said method comprising the steps of:
- temporarily storing a plurality of data units to be transmitted to a receiver in a send buffer;
- transmitting said plurality of data units to said receiver, said data units each comprising a sequence number;
- receiving acknowledgement (ACK) and non-acknowledgement (NACK) messages from said receiver on a first radio channel, wherein said receiver, in response to the receipt of each of said plurality of data units, attempts to decode said data unit at said receiver, and:
  - if said data unit is successfully decoded, transmits an acknowledgement (ACK) message, said ACK indicating to said transmitter that said data unit was successfully decoded by said receiver; or,
  - if said data unit is not successfully decoded, transmitting a non-acknowledgement (NACK) message, said NACK indicating to said transmitter that said data unit was not successfully decoded by said receiver; and,
- receiving a Status Message from said receiver on a second radio channel, said status message comprising one or more sequence position identifiers corresponding to said plurality of said data units;
- wherein said transmitter removes a transmitted data unit from said send buffer only in response to a Status Message indicating the successful decoding of said data unit by said receiver.

36. The method recited in claim 35, wherein said ACK and NACK messages consist of single bits.

37. The method recited in claim 35, wherein said ACK and NACK messages do not include said sequence position identifiers.

38. The method recited in claim 35, wherein said first radio channel utilizes an unreliable transmission method.

39. The method recited in claim 35, wherein said second radio channel utilizes a reliable transmission method.

40. The method recited in claim 35, wherein said Status Message is received in response to a request from said transmitter.

41. The method recited in claim 40, wherein said request from said transmitter comprises a flag within one of said plurality of data units.

42. The method recited in claim 35, wherein said Status Message comprises a single sequence position identifier indicating the highest numbered of said plurality of data units successfully received in sequence.

43. The method recited in claim 35, wherein said Status Message comprises the sequence position identifiers for each of said plurality of data units that have been correctly received.

44. The method recited in claim 35, wherein said Status Message comprises the sequence position identifiers for each of said plurality of data units that have been incorrectly received.

45. The method recited in claim 35, wherein said Status Message comprises a Cyclic Redundancy Check (CRC) value whereby said transmitter can verify that said Status Message is correctly received.

46. The method recited in claim 35, wherein said transmitter retransmits a data unit in response to the receipt of a corresponding NACK message or a Status Message indicating the non-delivery or failure to decode such data unit.

* * * * *